US012005424B2

(12) United States Patent
Bengtsson et al.

(10) Patent No.: US 12,005,424 B2
(45) Date of Patent: Jun. 11, 2024

(54) SEPARATION MATRIX AND METHOD OF SEPARATION

(71) Applicant: Cytiva BioProcess R&D AB, Uppsala (SE)

(72) Inventors: Jonas Bengtsson, Uppsala (SE); Linn Carlsson, Uppsala (SE); Andreas Axen, Uppsala (SE); Ronnie Palmgren, Uppsala (SE)

(73) Assignee: Cytiva BioProcess R&D AB, Uppsala (SE)

( * ) Notice: Subject to any disclaimer, the term of this patent is extended or adjusted under 35 U.S.C. 154(b) by 881 days.

(21) Appl. No.: 17/045,779

(22) PCT Filed: Apr. 24, 2019

(86) PCT No.: PCT/EP2019/060428

§ 371 (c)(1),
(2) Date: Oct. 7, 2020

(87) PCT Pub. No.: WO2019/206938

PCT Pub. Date: Oct. 31, 2019

(65) Prior Publication Data

US 2021/0060525 A1 Mar. 4, 2021

(30) Foreign Application Priority Data

Apr. 25, 2018 (GB) ..................................... 1806758

(51) Int. Cl.
*B01D 15/08* (2006.01)
*B01J 20/24* (2006.01)
(Continued)

(52) U.S. Cl.
CPC ............ *B01J 20/267* (2013.01); *B01D 15/08* (2013.01); *B01J 20/24* (2013.01);
(Continued)

(58) Field of Classification Search
CPC .... B01J 20/267; B01J 20/24; B01J 20/28023; B01J 20/28047; B01J 20/285;
(Continued)

(56) References Cited

U.S. PATENT DOCUMENTS 4,335,017 A 6/1982 Miles et al.
5,855,790 A 1/1999 Bradbury et al.
(Continued)

FOREIGN PATENT DOCUMENTS

CN 101218023 A 7/2008
CN 103769057 A 5/2014
(Continued)

OTHER PUBLICATIONS

PCT International Search Report and Written Opinion for PCT/EP2019/060428 mailed Jul. 30, 2019 (11 pages).
(Continued)

*Primary Examiner* — Waqaas Ali
(74) *Attorney, Agent, or Firm* — Eversheds Sutherland (US) LLP

(57) ABSTRACT

The invention discloses a separation matrix comprising polysaccharide gel beads, wherein said polysaccharide gel beads comprise embedded fibers. The invention further discloses a method of preparing the separation matrix and use of the matrix for separation purposes.

15 Claims, 3 Drawing Sheets

(51) Int. Cl.

| | |
|---|---|
| ***B01J 20/26*** | (2006.01) |
| ***B01J 20/28*** | (2006.01) |
| ***B01J 20/285*** | (2006.01) |
| ***B01J 20/291*** | (2006.01) |
| ***B01J 20/30*** | (2006.01) |

(52) U.S. Cl.

CPC ... *B01J 20/28023* (2013.01); *B01J 20/28047* (2013.01); *B01J 20/285* (2013.01); *B01J 20/291* (2013.01); *B01J 20/3042* (2013.01); *B01J 2220/445* (2013.01); *B01J 2220/54* (2013.01)

(58) Field of Classification Search

CPC .................. B01J 20/291; B01J 20/3042; B01J 2220/445; B01J 2220/54; B01J 13/0052; B01J 20/26; B01J 20/30; B01D 15/08; C08L 1/02; C08L 5/12; D21H 11/18; C08B 37/0039; G01N 30/02

See application file for complete search history.

(56) References Cited

U.S. PATENT DOCUMENTS

| | | | |
|---|---|---|---|
| 6,602,990 | B1 | 8/2003 | Berg |
| 2002/0037565 | A1 | 3/2002 | Blanche et al. |
| 2005/0220982 | A1 | 10/2005 | Moya |
| 2006/0060534 | A1 | 3/2006 | Berg et al. |
| 2008/0154031 | A1 | 6/2008 | Berg et al. |
| 2010/0084328 | A1 | 4/2010 | Ma et al. |
| 2014/0374254 | A1 | 12/2014 | Lauraeus et al. |
| 2016/0175812 | A1 | 6/2016 | Mohammed et al. |

FOREIGN PATENT DOCUMENTS

| | | | | |
|---|---|---|---|---|
| CN | 107754773 | A | 3/2018 | |
| JP | H06-15163 | A | 1/1994 | |
| JP | 2003523169 | A | 8/2003 | |
| WO | 2003/091315 | A1 | 11/2003 | |
| WO | 2010/096704 | A2 | 8/2010 | |
| WO | 2013/093196 | A1 | 6/2013 | |
| WO | WO-2013093196 | A1 * | 6/2013 | ............. B01D 15/08 |
| WO | 2015/180844 | A1 | 12/2015 | |

OTHER PUBLICATIONS

Great Britain Search Report for GB 1806758.7 mailed Nov. 27, 2018 (7 pages).

Chen et al., "Biodegradation of Tetrahydrofuran by Pseudomonas oleovorans DT4 Immobilized in Calcium Alginate Beads Impregnated with Activated Carbon Fiber: Mass Transfer Effect and Continuous Treatment," Bioresource Technology, 2013, 139:87-93.

Kim et al., "Alginate/Bacterial Cellulose Nanocomposite Beads Prepared using Gluconacetobacter xylinus and Their Application in Lipase Immobilization," Carbohydrate Polymers, 2017, 157:137-143.

Le Goff et al., "Rheological Study of Reinforcement of Agarose Hydrogels by Cellulose Nanowhiskers," Carbohydrate Polymers, 2015, 116:117-123.

Osorio-Madrazo et al., "Reorientation of Cellulose Nanowhiskers in Agarose Hydrogels under Tensile Loading," Biomacromolecuiles, 2012, 13:850-056.

Second Office Action issued in corresponding China application No. 201980028053.5, mailed Jul. 26, 2023 (24 pages).

Senyang, Zhuang, A Study on Biomass-Based Porous Ultra-Lightweight Composites, China Master's Theses Full-text Database, Jan. 15, 2017, pp. B020-B031.

Chinese Office Action for CN Application No. 201980028053.5, Issued Dec. 19, 2022 (21 pages, with English translation).

Japanese Office Action for JP Application No. 2020-559430, mailed Apr. 24, 2023 (9 pages, with English translation).

Le Goff et al. "Rheological study of reinforcement of agarose hydrogels by cellulose nanowhiskers", Carbohydrate Polymers, 2015, 116: pp. 117-123.

Osorio-Madrazo et al. "Reorientation of Cellulose Nanowhiskers in Agarose Hydrogels under Tensile Loading", Bio Macromolecules, 2012, 13 (3): pp. 850-856.

* cited by examiner

SEPARATION MATRIX AND METHOD OF SEPARATION

CROSS REFERENCE TO RELATED APPLICATIONS

This application claims the priority benefit of PCT/EP2019/060428 filed on Apr. 24, 2019, which claims priority to Great Britain Application No. 1806758.7 filed on Apr. 25, 2018, the entire contents of which are hereby incorporated by reference herein.

TECHNICAL FIELD OF THE INVENTION

The present invention relates to separation matrix particles, and more particularly to polysaccharide-based chromatography matrices comprising embedded fibers for separation of biologicals such as proteins, nucleic acids, and viruses.

BACKGROUND OF THE INVENTION

In the manufacturing of biopharmaceuticals such as vaccines, antibodies, recombinant proteins, gene therapy vectors etc. several chromatographic separation steps are usually needed to remove various contaminants and impurities from the product. These separation steps add significant cost and process time and there is hence a significant interest in intensifying the separation, e.g. by increasing binding capacities and/or increasing flow rates. Accordingly, there is a need for separation matrices with sufficient rigidity to accommodate high flow rates.

Generally, chromatographic separations are carried out in columns packed with the separation matrix in form of gel beads. One example is size-exclusion chromatography (SEC). Separation of large biological entities, for example large proteins or viruses, requires beads with large pores. However, large pores may lead to lower rigidity and the separation matrix may collapse at high flow rates. It is therefore common practice to cross-link the polymer to make it more stable and increase rigidity. Such cross-linking takes place between the polysaccharide hydroxyl groups and the functional groups of the cross-linker. In EP203049 methods for improving the rigidity of gel beads are described using a monofunctional cross-linking agent comprising a masked functional group. In another example, in WO97/38018 manufacturing methods for cross-linking polysaccharide gels to obtain large pores and high rigidity are described comprising the step of introducing a cross-linking agent into the polysaccharide solution prior to gel formation. In these methods, the cross-linking results in a bridge between the polysaccharide chains. An example of a commercial product using cross-linked agarose is Superose™ (trademark of GE Healthcare). The rigidity of Superose even allow viscous eluents, such as 8 M urea, to be run at practical flow rates. Thus, chemical cross-linking of polysaccharide gel beads, using cross-linking agents such as epichlorohydrin, bis-epoxides, allylglycidyl ether, allylbromide, and divinyl sulphone, is an established method for making separation matrices with improved rigidity for chromatographic separation.

SUMMARY OF THE INVENTION

One aspect of the invention is to provide a separation matrix which exhibits high porosity and/or high rigidity for improved separation of biologicals, such as proteins, nucleic acids, and viruses. This is achieved with a separation matrix comprising polysaccharide gel beads, wherein said polysaccharide gel beads comprise embedded fibers.

A second aspect of the invention is to provide a method of manufacturing the separation matrix by mixing an aqueous solution of at least one gellable polysaccharide with fibers and forming gel beads of the aqueous solution.

A third aspect of the invention is to provide a use of the separation matrix for purification, isolation or removal of a target compound.

Further suitable embodiments of the invention are described in the dependent claims.

DEFINITIONS

Figure 1:
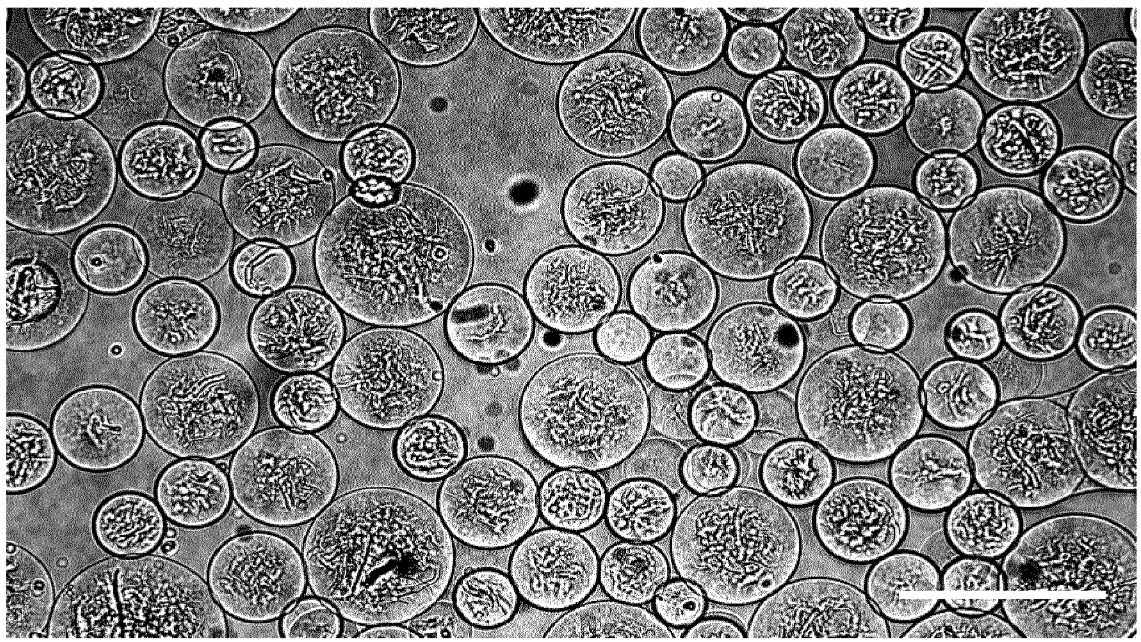
FIG. 1 shows a microscope image of agarose gel beads comprising embedded cellulose fibers. The fibers were embedded at a concentration of 6% of the dry agarose weight, and the agarose concentration was 2% (of water weight). The microfibrillated cellulose is dispersed in the gel beads. The white scale bar indicates 200 μm.

As used herein, the terms "comprises," "comprising," "containing," "having" and the like can have the meaning ascribed to them in U.S. Patent law and can mean "includes," "including," and the like; "consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

As used herein, the term "fiber" can have the meaning of a single fiber and it can also mean a fiber comprising aggregates of fibrils.

DETAILED DESCRIPTION OF EMBODIMENTS

In one aspect, the present invention discloses a separation matrix comprising polysaccharide gel beads wherein the polysaccharide gel beads comprise embedded fibers. The gel bead polysaccharide can be any polysaccharide, for example agar, agarose, agarose derivatives, starch derivatives, dextran or derivatives thereof, or alginate. Particularly suitable are thermally gelling polysaccharides producing large pore gels of high rigidity, such as agar, agarose and agarose derivatives (e.g. allyl- or hydroxyethyl agarose).

In some embodiments, the embedded fibers may be any fibers which can be embedded in gel beads, for example organic fibers, carbon nanofibers, mineral fibers, synthetic fibers such as plastic fibers or fibers with a metallic core. In specific embodiments, the dimensions of such fibers allow them to be embedded in the gel beads, therefore the average length or the maximal length or end-to-end distance of the embedded fibers is typically smaller than the gel bead diameter, for example in the 1-500 micrometer range.

In certain embodiments, the fibers comprise aggregated fibrils, exhibit furcations and/or have a "brush-like" structure, one example of such fibers is microfibrillated cellulose (MFC). Typically, the fibers are furcated, i.e. they exhibit one or more branches at acute angles from a fiber backbone. In more general terms, the fibers can also be described as branched. These fibers are easily dispersed in solutions which mix well with agarose solutions. One example of such microfibrillated cellulose is the Exilva Forte™ (Borregaard, Norway) cellulose suspension. Other examples are described in e.g. U.S. Pat. Nos. 4,374,702, 8,647,468, 6,214, 163 and US20170121908, all of which are hereby incorporated by reference in their entireties. In some embodiments, cellulose fibers are dispersed in agarose gel beads.

In some embodiments, the fibers are completely embedded in the gel beads resulting in gel beads with an average sphericity greater than 0.95. Sphericity is here defined in the normal way as the ratio of the surface area of a sphere with the same volume as a given particle to the actual surface area of the particle. This can suitably be determined by image analysis of microscope pictures. Suitably, the gel beads have a smooth surface. Such spherical gel beads are easy to store, handle, and pack in a separation column. Furthermore, the high sphericity and smooth surface prevents non-specific interactions as there are no protruding fibers which may hinder close packing and thereby increase the void volume or interact to cause aggregation or other adverse packing effects. In certain embodiments, less than 10% of the gel beads, such as less than 5% or less than 2% of the gel beads have one or more protruding fibers visible in a microscope.

An aspect of this invention is a process of manufacture of a separation matrix comprising embedded fibers. In one embodiment, the method for preparing the separation matrix comprise the steps of mixing an aqueous solution of at least one gellable polysaccharide with fibers and subsequently forming gel beads of said aqueous solution. The inclusion of the fibers in the aqueous polysaccharide solution before forming gel beads allow for embedding the fibers within the gel beads.

In some embodiments, the process of manufacture comprises the step of gel bead formation by emulsifying the aqueous solution containing the polysaccharide, for example agarose, and fiber, for example cellulose, in an oil phase, such as toluene or heptane. In such embodiments, gel beads are formed by reducing the temperature of the emulsion to induce gelation.

In some embodiments, the separation gel bead matrix polysaccharide is agarose and the fiber is cellulose, and the agarose content and the fiber-to-agarose ratio may be varied to achieve a desired porosity and selectivity for the separation of biologicals. In some embodiments, the separation matrix comprises embedded cellulose fibers of up to 80% of agarose weight (i.e. the non-fiber matrix dry weight) and the agarose concentration can be up to 20% by total weight. The amount of embedded cellulose fibers can e.g. be up to 20% of the agarose weight, such as up to 10%, 0.1-10% or 0.1-7% of the agarose weight. The agarose concentration in the solution can e.g. be up to 10 wt. %, such as up to 6% or 1-6%.

In some embodiments, one or more components are further added to the agarose solution before gelling. Such components add additional functional elements to the separation matrix, for example magnetic particles (e.g. magnetite particles), low- or high-density particles (e.g. microballoons, metal particles or tungsten carbide particles) or molecule binding components for subsequent separation of biologicals.

In some embodiments, the manufacturing process comprises an additional step of attaching chromatography ligands to the gel beads, for example using the reactive hydroxyl groups of the gel beads. This allows the separation matrix to be used for purification of specific molecules, or specific biological entities like viruses, which bind to the ligand.

In some embodiments, the mechanical stability of the manufactured bead is increased by cross-linking to better withstand high column pressures when used as a separation matrix. Accordingly, in one embodiment, the agarose is chemically cross-linked in addition to the physical cross-linking that occurs spontaneously during gelling. There are many conventionally used and well-known cross-linkers available, and accordingly the skilled person in this field can easily select a suitable cross-linker depending on the agarose used, the intended use of the final product etc. The cross-linker may also contain one or more inactive sites which are activated later in the process for cross-linking of the polysaccharide. As illustrating examples, epichlorohydrin, bis-epoxides, allylglycidyl ether, allylbromide, and divinyl sulphone, etc. can be used. The cross-linking is performed at least once but may be repeated, either with the same cross-linker or with other cross-linker molecules, or a mixture of cross-linkers.

In some embodiments, the embedded fibers are chemically cross-linked with the polysaccharide of the separation matrix gel bead, such that the fibers are covalently linked to the polysaccharide molecules of the gel. For the example, in the case of cellulose fibers and agarose gel beads, this can be achieved by standard cross-linking methods using available hydroxyl groups for cross-linking. Chemical cross-linking of fibers and polysaccharides inside gel beads allow for structural support and improved rigidity. The short-distance covalent bond of the fiber and the separation matrix integrates and fixates the fibers into the polysaccharide separation matrix. In these especially advantageous embodiments, cross-linking makes the resulting separation matrix more stable, both mechanically and chemically. As illustrating examples, epichlorohydrin, bis-epoxides, allylglycidyl ether, allylbromide, and divinyl sulphone, etc. can be used. The cross-linking is performed at least once but may in some embodiments be repeated, either with the same cross-linker or with other cross-linker molecules, or with a mixture of cross-linkers. The cross-linking compound may also contain one or more inactive sites which are activated later in the separation matrix preparation process.

In some embodiments, cross-linking also allow for tailoring of the physical properties of the gel beads by varying the fiber-to-agarose ratio and the degree of cross-linking Different ratios and cross-linking conditions result in different porosity and selectivity characteristics of the separation matrix. In one advantageous embodiment the fibers are embedded at suitable concentration, e.g. 0.1-10% of the agarose weight, and cross-linking of bead polysaccharide is carried out, in such a way that the rigidity of the gel beads is improved and the porosity of the separation matrix allow for improved separation of larger molecules, compared to separation without the fibers.

In some embodiments the gel beads are washed after cooling of the emulsion, with for example ethanol or water, or both ethanol and water, to remove the organic solvent and any remaining non-embedded fibers or chemicals from the separation matrix. This embodiment is especially advantageous because it is easy to resuspend the beads in a storage buffer without any remaining non-embedded fibers, which may affect the separation properties of the separation matrix.

In some embodiments, a separation matrix with embedded fibers is used in a method of separating, isolating, or removing a target compound, comprising a step of contacting the separation matrix with a liquid comprising said target compound. Such a method and use may for example be carried out using the separation matrix packed in a chromatography column. Such methods benefit from the novel separation properties of the separation matrix with embedded fibers. One example, is improved rigidity and selectivity allowing for separation of large molecules and biological entities, for example viruses, in shorter time.

EXAMPLES

The preparation of porous agarose beads with embedded cellulose fibers followed a water in oil (w/o) emulsion procedure which main steps are described in WO97/38018, hereby incorporated by reference in its entirety. The main difference to the known methods for preparing gel beads for use as a separation matrix is the addition of cellulose fibers to the agarose solution prior to gelation, as outlined in the following steps.

Cellulose

Microfibrillated cellulose is a natural cellulose in which the fibers have been opened to form fibrils and microfibrils by passage through a homogenizer. Homogenizing reduces the average fiber length to the micrometer scale and reduces the average fiber diameter to sub-micrometer scale. Such cellulose fibrils show bifurcations and "brush-like" structure as described in WO2015/180844, hereby incorporated by reference in its entirety. Microfibrillated celluloses are available as commercial products, for example the Exilva Forte cellulose suspension, dry content 1.7%, from Borregaard which was used in the examples described herein.

Preparation of Agarose and Cellulose Solution

Agarose was dispersed in water. The agarose-water dispersion was heated above its melting temperature (~85° C.) and cellulose was added as a heated water suspension and dispersed in the agarose by using a motor driven propeller blade stirrer. Agarose and cellulose was added and mixed in different ratios, and different total concentration, see Table 2. In some experiments allylated agarose was used (see below).

Oil Phase

Toluene and dissolved emulsifier (Aqualon™ ethyl cellulose, N50 from Ashland) were heated to 60° C. before addition of the solution containing agarose and cellulose.

Transfer of the Agarose Solution to the Emulsification Reactor

Small water droplets were formed and dispersed in the oil phase by the turbine stirrer and their particle size in the emulsion was regulated by the stirrer speed, smaller particles formed at higher speeds.

Cooling Process

When the particles reached a desired size, for example 100 μm in diameter, the emulsion was cooled to room temperature.

Gel Washing and Sieving

The gel particles were washed, first with ethanol and then with water. To narrow the size distribution of the particles, they were wet sieved to between 50-166 μm.

Cross-Linking

Both allylated and non-allylated samples were prepared according to the methods described in WO97/38018. In short, allylglycidyl ether and sodium hydroxide were used for the allylation step and the reaction was stopped using acetic acid to reach neutral pH. The non-allylated samples were crosslinked at 50° C. using epichlorohydrin and for the allylated samples a second cross-linking step was carried out using bromine.

Compression Measurements of Gels

A texture analyzer (CT3, Brookfield) was used to measure the compression resistance of the gels. After removal of water in the void volume a 3.7 ml gel cylinder was prepared in a 12.9 mm diameter, 28.5 mm length cylindrical cavity with a glass filter bottom. The analysis was carried out using a 12 mm diameter cylindric piston which was lowered against the gel surface into the cavity with a speed of 0.1 mm/s until a load of 3000 g-4000 g was reached. The penetration length of the piston into the gel was measured simultaneously as the force acting on the piston from the gel during indentation.

Light Microscopy

An Eclipse E600 (Nikon) microscope was used to capture transmitted light images of gel beads.

Porosity ($K_D$) Analysis

Size-exclusion chromatography was used to measure the porosity and size exclusion selectivity of different beads. The porosity can be expressed as a $K_{AV}$ or $K_D$ value (the fraction of the stationary phase that is available for diffusion of a given molecular species) measured by inverse size exclusion chromatography, e.g. according to the methods described in Gel Filtration Principles and Methods, Pharmacia LKB Biotechnology 1991, pp 6-13. $K_{AV}$ is determined as the ratio $(V_e-V_0)/(V_t-V_0)$, where Ve is the elution volume of a probe, $V_0$ is the void volume of the column (e.g. the elution volume of a high Mw void marker, such as native dextran) and $V_t$ is the total volume of the column. $K_D$ can be determined as $(V_e-V_0)/V_i$, where $V_i$ is the elution volume of a salt (e.g. NaCl) able to access all the volume except the matrix volume (the volume occupied by the matrix polymer molecules). Both $K_D$ and $K_{AV}$ values always lie within the range 0-1. Different separation matrixes exhibit different $K_D$ and $K_{AV}$ values for a given analyte molecule. An ÄKTA™ Explorer FPLC (Fast Protein Liquid Chromatography) (GE Healthcare Biosciences) machine was used for $K_D$ measurements. An autosampler and columns with inner diameter of 1 cm (HR1030, GE Healthcare Biosciences) were used. The software UNICORN™ 5.31 (GE Healthcare Biosciences) was used to evaluate the chromatograms. The analytes for the experiments were native dextran as a void volume marker, only passing outside the pores, and sodium chloride as marker for $V_t$, total liquid volume. Also, four different molecular weights of dextran were used as seen in Table 1.

| Analyte: | Native dextran | Dextran | | | | NaCl |
|---|---|---|---|---|---|---|
| Peak molecular weight (Mp): | 5-40 million Da | 3 million Da | 1 million Da | 401 kDa | 196 kDa | 58 Da |

Table 1 shows analytes with corresponding Mp-values (peak molecular weight) used for porosity measurements of different gel bead samples.

| Agarose content (% of water weight) | Cellulose content (% of dry agarose weight) | FIG. |
|---|---|---|
| 2% | 6% | 1 |
| 4% | 0% and 0.2% | 2 |
| 1% and 2% | 0% and 6% | 3 |

Figure 2:
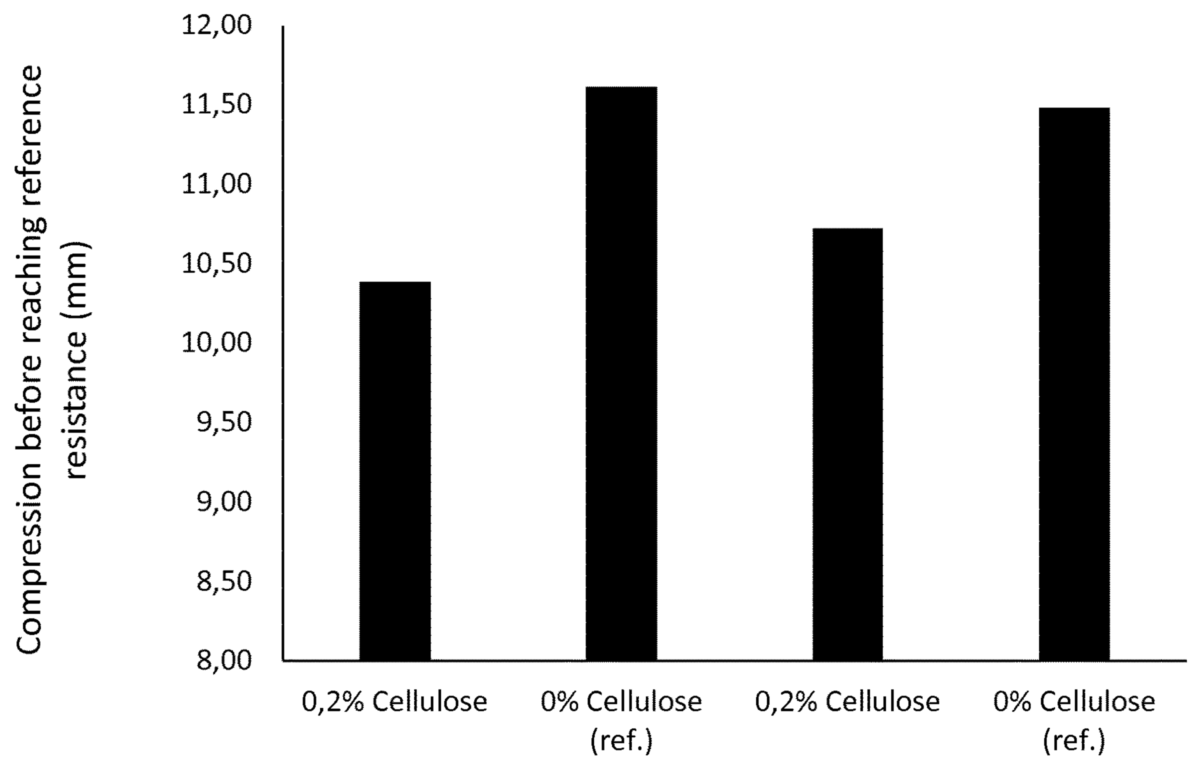
FIG. 2 shows that addition of cellulose changes the separation matrix resistance to compression. A lower compression is an indication of higher gel bead rigidity. The final agarose concentration was 4% (of water weight).
Figure 3:
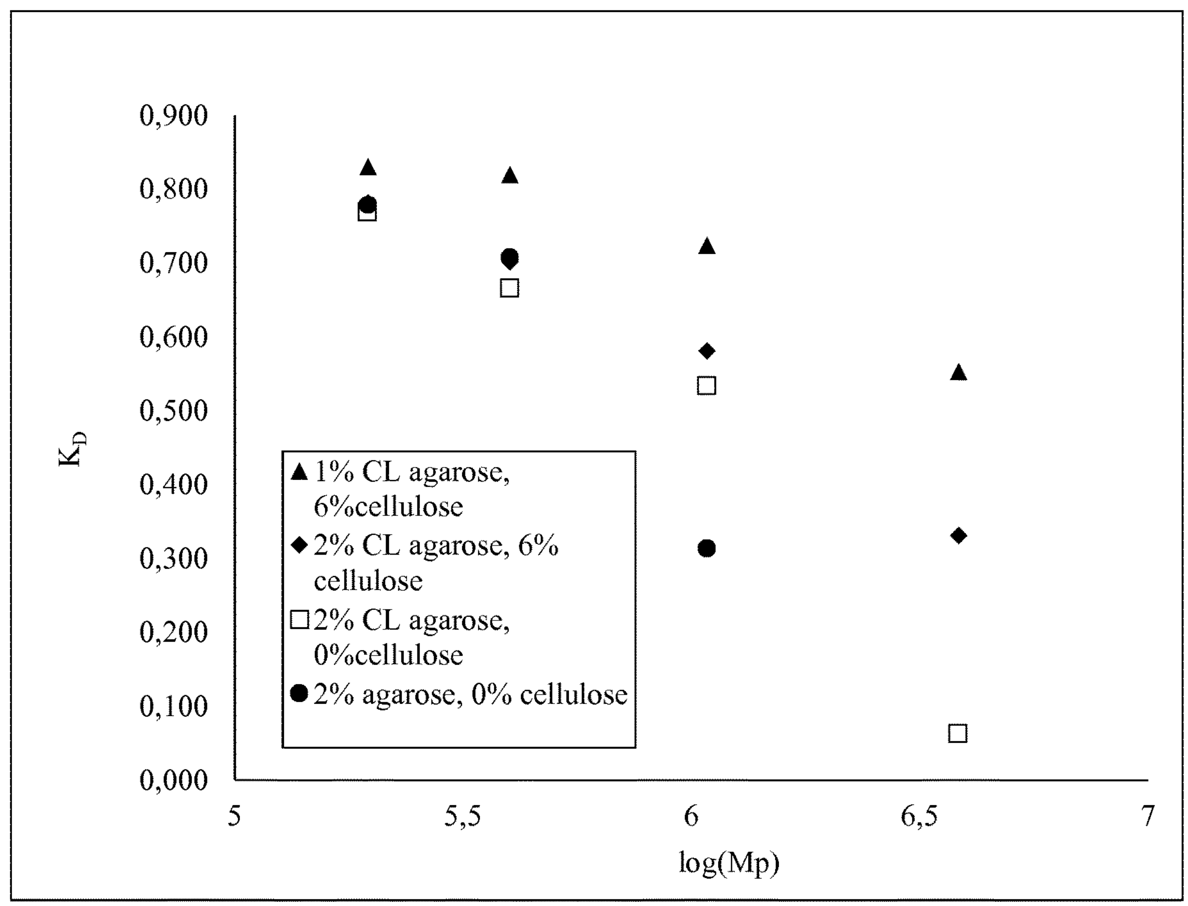
FIG. 3 shows $K_D$ values and the logarithm of peak molecular weight (Mp) for four analytes. Higher $K_D$ value represents larger available pore volume for the analyte. Larger log(Mp) indicates larger analyte. "CL agarose" is a short notation for cross-linked allylated agarose.

Table 2 shows examples of different samples in FIGS. 1 to 3.

The examples described herein show that separation matrices comprising gel beads with embedded fibers exhibit novel and highly useful separation properties. For example, gel beads with high rigidity and large pores can be prepared and used as described. For example, FIG. 3 shows that using beads with embedded fibers allow for separation of large molecules and biological entities under practical flow rates. Thus, gel beads with embedded fibers allow for preparation and use of a separation matrix with novel separation properties, such as increased porosity and/or rigidity compared to gel beads without fibers.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Any patents or patent applications mentioned in the text are hereby incorporated by reference in their entireties, as if they were individually incorporated.

The invention claimed is:

1. A separation matrix comprising polysaccharide gel beads, wherein said polysaccharide gel beads comprise embedded fibers, wherein the embedded fibers comprise microfibrillated cellulose, and wherein the embedded fibers are chemically cross-linked to the polysaccharide wherein the polysaccharide gel beads comprise agarose or agar.

2. The separation matrix of claim 1, wherein said embedded fibers are dispersed in the polysaccharide gel beads.

3. The separation matrix of claim 1, wherein the separation matrix comprises embedded fibers of up to 80% of the non-fiber matrix dry weight.

4. The separation matrix of claim 1, wherein the embedded fibers are furcated.

5. The separation matrix of claim 1, wherein the polysaccharide gel beads comprise agarose or agar.

6. The separation matrix of claim 1, comprising polysaccharide gel beads with sphericity greater than 0.95 wherein the polysaccharide gel beads comprise agarose or agar.

7. A method for preparing a separation matrix, which method comprises the steps of a. mixing an aqueous solution of at least one gellable polysaccharide with fibers, wherein the fibers comprises microfibrillated cellulose;

b. forming gel beads of said aqueous solution;

c. cross-linking said gellable polysaccharide with said fibers to embed the fibers in the gel beads.

8. The method of claim 7, further comprising, after step b., a step c. of cross-linking said gellable polysaccharide of said gel beads.

9. The method according to claim 7, further comprising a step of attaching chromatography ligands to reactive hydroxyl groups of said gel beads.

10. The method according to claim 7, wherein the solution of the gellable polysaccharide with the fibers is emulsified in an oil phase and said gel beads are formed by reducing the temperature to induce gelation.

11. The method according to claim 7, comprising a cross-linking step which comprises addition of epichlorohydrin.

12. The method according to claim 7, wherein the gellable polysaccharide solution comprises embedded fibers of up to 80% of non-fiber matrix dry weight.

13. A method of use of a separation matrix, comprising using the separation matrix as defined in claim 1 to purify, isolate, or remove a target compound.

14. The use according to claim 13 wherein said separation matrix is packed in a chromatography column.

15. A method of separating a target compound, comprising a step of contacting the separation matrix of claim 1 with a liquid comprising said target compound.

* * * * *